United States Patent [19]
Ware et al.

[11] Patent Number: 6,082,303
[45] Date of Patent: Jul. 4, 2000

[54] MACHINE FOR PLANTING SHELLFISH SEEDLINGS

[75] Inventors: Keith Ware, Black Creek; Rob Jackson, Merville; Doug Sabo, Comox; Fred Lochmatter, Courtenay; Reinhold Seiler, Qualicum Beach, all of Canada

[73] Assignee: Fan Seafoods Ltd., Courtenay, Canada

[21] Appl. No.: 09/196,691

[22] Filed: Nov. 20, 1998

[51] Int. Cl.[7] .................................................. A01K 61/00
[52] U.S. Cl. ................................................................ 119/200
[58] Field of Search ................................... 119/200, 202, 119/204, 215; 47/56; 111/109, 105, 104

[56] References Cited

U.S. PATENT DOCUMENTS

| | | | |
|---|---|---|---|
| 2,053,390 | 9/1936 | Bateman et al. | |
| 3,648,464 | 3/1972 | Edwards | 405/24 |
| 3,901,190 | 8/1975 | Wiegardt, Jr. | 119/237 |
| 4,052,961 | 10/1977 | Garrett, Jr. et al. | 119/238 |
| 4,253,411 | 3/1981 | Shulzhenko et al. | 111/105 |
| 4,934,290 | 6/1990 | Benest | 111/105 |

FOREIGN PATENT DOCUMENTS

408256630  10/1996  Japan.

*Primary Examiner*—Peter M. Poon
*Assistant Examiner*—Yvonne R. Abbott
*Attorney, Agent, or Firm*—Oyen Wiggs Green & Mutala

[57] ABSTRACT

A vehicular machine for planting shellfish seedlings in the seafloor has a seeding drum with water inlet ports in its outer circumferential surface through which a suction is applied to pick up shellfish seedlings from a hopper, move them to a position close to the seafloor and deposit them onto the seafloor. The machine includes a net and apparatus for unwinding and placing the net on the seafloor over the deposited seedlings as the machine moves forward.

13 Claims, 7 Drawing Sheets

MACHINE FOR PLANTING SHELLFISH SEEDLINGS

TECHNICAL FIELD

The invention pertains to sea farming and more particularly to the planting of shellfish seedlings. Specifically, it pertains to a mobile machine for planting shellfish seedlings on the seafloor and to a method of planting shellfish seedlings.

BACKGROUND

It is known that certain shellfish, for example geoducks (*Panope generosa* of the Lamellibranchia class of Mollusca), can be planted as seedlings in the seafloor and grown there until harvested. Geoduck planting has been carried out by several methods. Seedlings have been planted by simply dumping them overboard from a boat. The survival rate of the seedlings using such method is low, in part because they are subject to various predators, such as crabs and starfish, before they can bury themselves in the seafloor. Geoduck seedlings have also been planted by hand, one at a time, a method that is slow and labour intensive.

The survival rate of planted seedlings is directly related to the planting method and to the protection provided after planting. It also depends on the handling of the seedlings during the 48 hour period after removal of the seedlings from the nursery. It has been found that transport, handling and a change of environment can cause shellfish seedlings to fall into a prolonged state of inactivity and shock.

It is accordingly desirable to provide an apparatus for planting shellfish seedlings efficiently and quickly, while handling them in a gentle and non-injurious manner, and for providing protection for them after planting.

SUMMARY OF INVENTION

The invention is a machine for planting shellfish seedlings, for example geoduck seedlings, in the seafloor. It is a vehicular machine with a frame and means such as wheels or tracks permitting the apparatus to be moved on the seafloor. It can be propelled by hand, i.e. by being pushed by divers, or can be towed by another vehicle, or it can include a motor and drive train to be self-propelled. The machine has a seeding drum with a plurality of spaced water inlet ports, with suction provided at the ports for picking up the shellfish seedings from a hopper in which the seedlings are held in contact with the surface of the seeding drum. The seeding drum rotates as the machine is moved on the seafloor, so seedlings are picked up from the hopper, held on the surface of the drum at the inlet ports by the suction and moved into a position on the drum close to the seafloor. They are then knocked off the rotating drum by means of a bumper strip and are deposited on the seafloor. The apparatus includes a protective net and means for placing it over the deposited seedlings. The net unwinds as the machine moves forward, covering the seedlings. Means are provided for embedding the lateral edges of the net in the seafloor in order to anchor it in position and for spacing the center of the net above the seafloor to create a protective space above the seedings.

The machine can be used for planting seedlings of many kinds of shellfish, including geoducks, oysters, clams, cockles, scallops, sea cucumbers, sea urchins, etc.

The invention is also directed to a method of planting shellfish seedlings in a seafloor. The method comprises the steps of creating a suction at water inlet ports at the surface of a rotatable drum, bringing the shellfish seedings into contact with the surface of the drum, rotating the drum so that the seedlings are picked up and held on the surface of the drum at the water inlet ports by the suction and are moved to a position above the seafloor; and removing the seedlings from the water inlet ports, so the seedlings fall to the seafloor. The suction is preferably created by delivering compressed gas to a chamber operatively connected through the drum to the water outlet ports and permitting the gas to expand and escape therefrom, causing a partial vacuum within the drum.

BRIEF DESCRIPTION OF DRAWINGS

FIG. 6(*a*) is a schematic view showing the operation of the planting drum;

FIG. 6(*b*) is a schematic view showing a detail of the view of FIG. 6(*a*);

FIG. 6(*c*) is an elevation view of a portion of the bumper strip and planting drum;

DESCRIPTION

Figure 1:
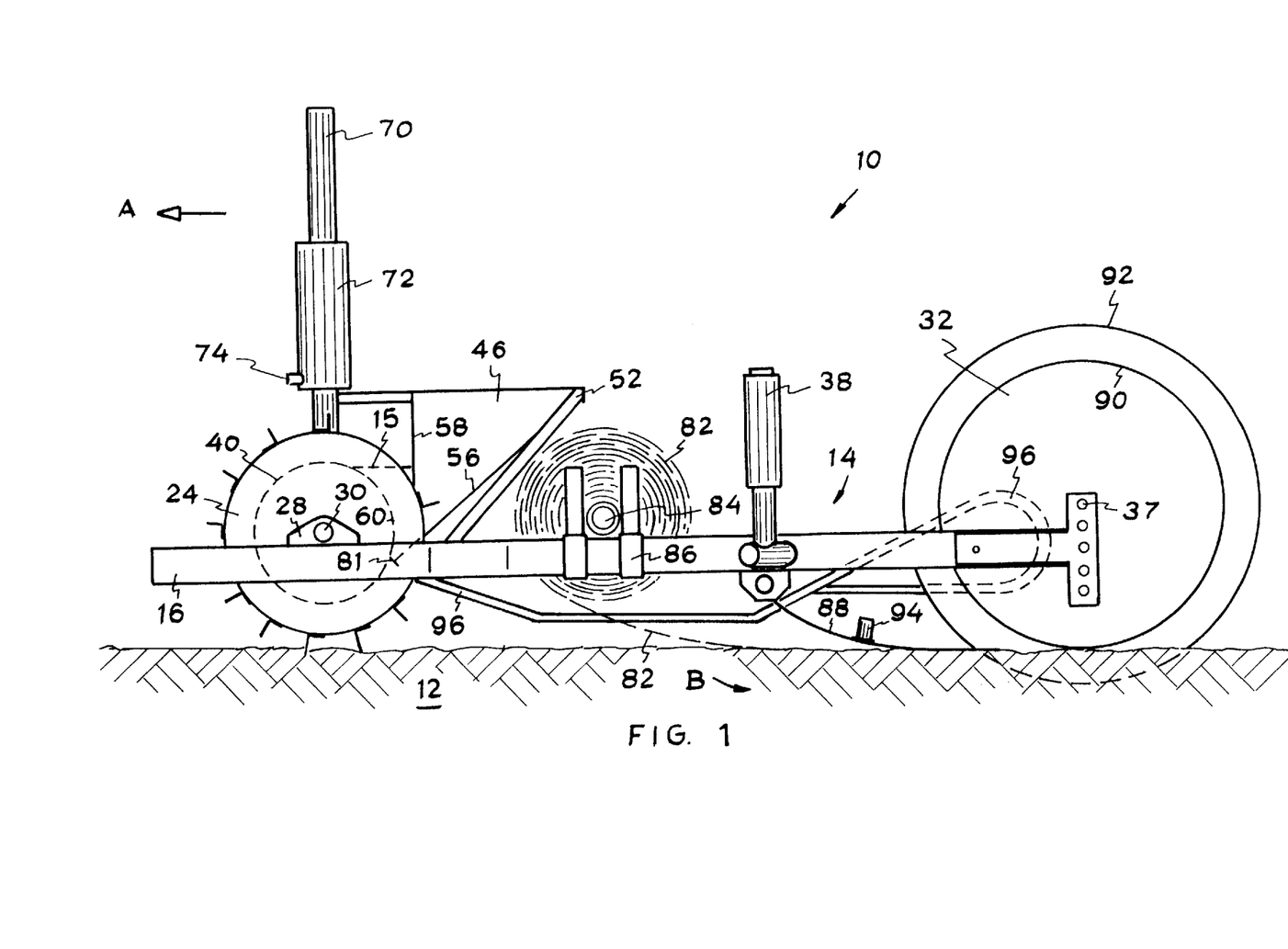
FIG. 1 is a left side elevation view of the planting machine according to a preferred embodiment of the invention.
Figure 2:
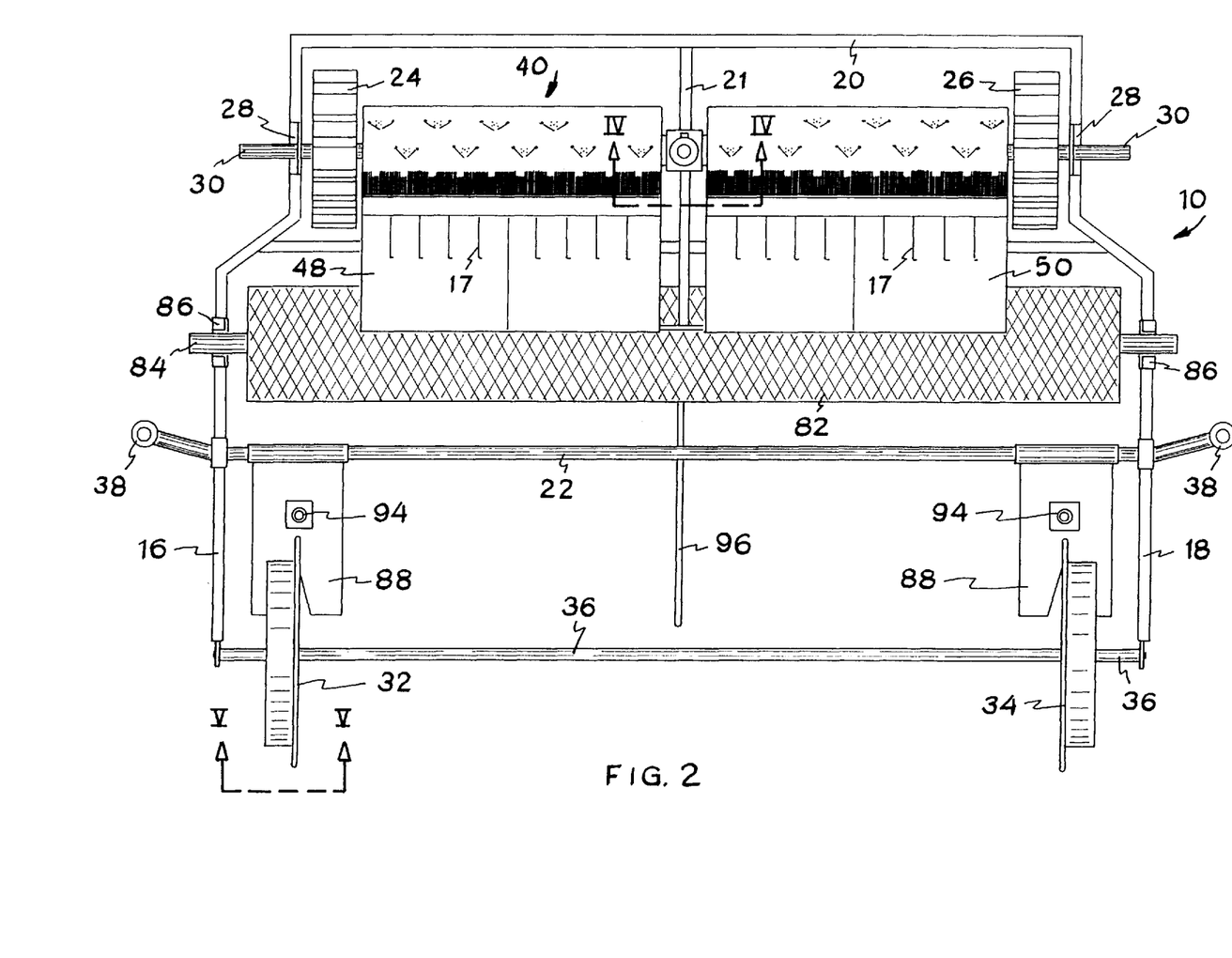
FIG. 2 is a top plan view thereof.
Figure 8:
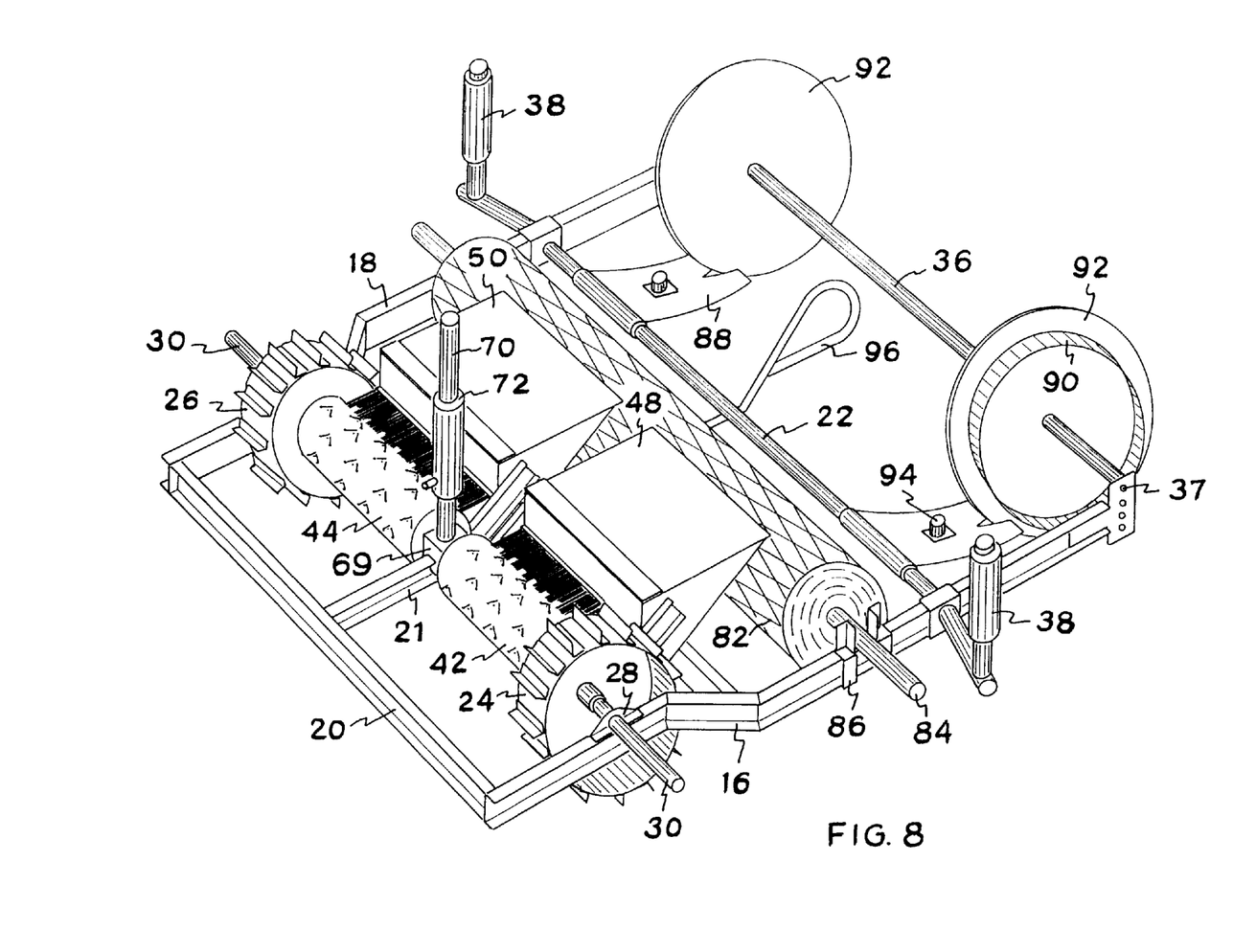
FIG. 8 is a perspective view of the planting machine.

Referring to FIGS. 1, 2 and 8, the planting machine 10 is a four-wheeled vehicle adapted for movement under water across the seafloor 12. In this specification, "seafloor" refers to the bed of both salt and fresh water bodies. The planting machine has a generally rectangular frame 14 comprising left and right side frame members 16, 18, front frame member 20 and rear frame member 22. The frame members are aluminum U-beams. Two front wheels 24, 26 are fixed to the side frame members by bearings 28, in which front wheel axle 30 may rotate. The front wheels 24, 26 support the front end of the planting machine 10 on the seafloor 12. Rear wheels 32, 34 are affixed by rear axle 36 to the side frame members 16, 18 respectively at their back ends and support the back end of the planting machine on the seafloor. A set of vertically spaced bearings 37 is provided in frame members 16, 18 for connection of rear axles 36 at a selected height, permitting the adjustment of the height of the rear end of the machine.

The machine has handles 38 affixed to the side frame members to provide means for divers to grip the apparatus for pushing it across the seafloor. Alternatively, the machine may be towed by another vehicle, such as a self-propelled tractor adapted for use on the seafloor. The apparatus may optionally be provided with a motor suitably connected to the wheels by conventional drive train devices, for supplying motive power. For example, such motor may be a water or an oil hydraulic motor, with a pump located in a boat on the water surface above the planting machine to supply pressurized fluid by hoses to the motor. This pressure, converted into rotary motion by the motor, generates the necessary torque via the drive train (for example, a gearbox, worm drive and drive gears connected to one or more wheels) to propel the machine.

The planting machine has a planting drum 40 comprising a left side portion 42 and a right side portion 44. The planting drum is a cylindrical body with its axis perpendicular to the longitudinal axis of the planting machine. It is affixed to front wheel axle 30 so that it rotates about its axis as wheels 24, 26 turn as the planting machine is moved.

Figure 3:
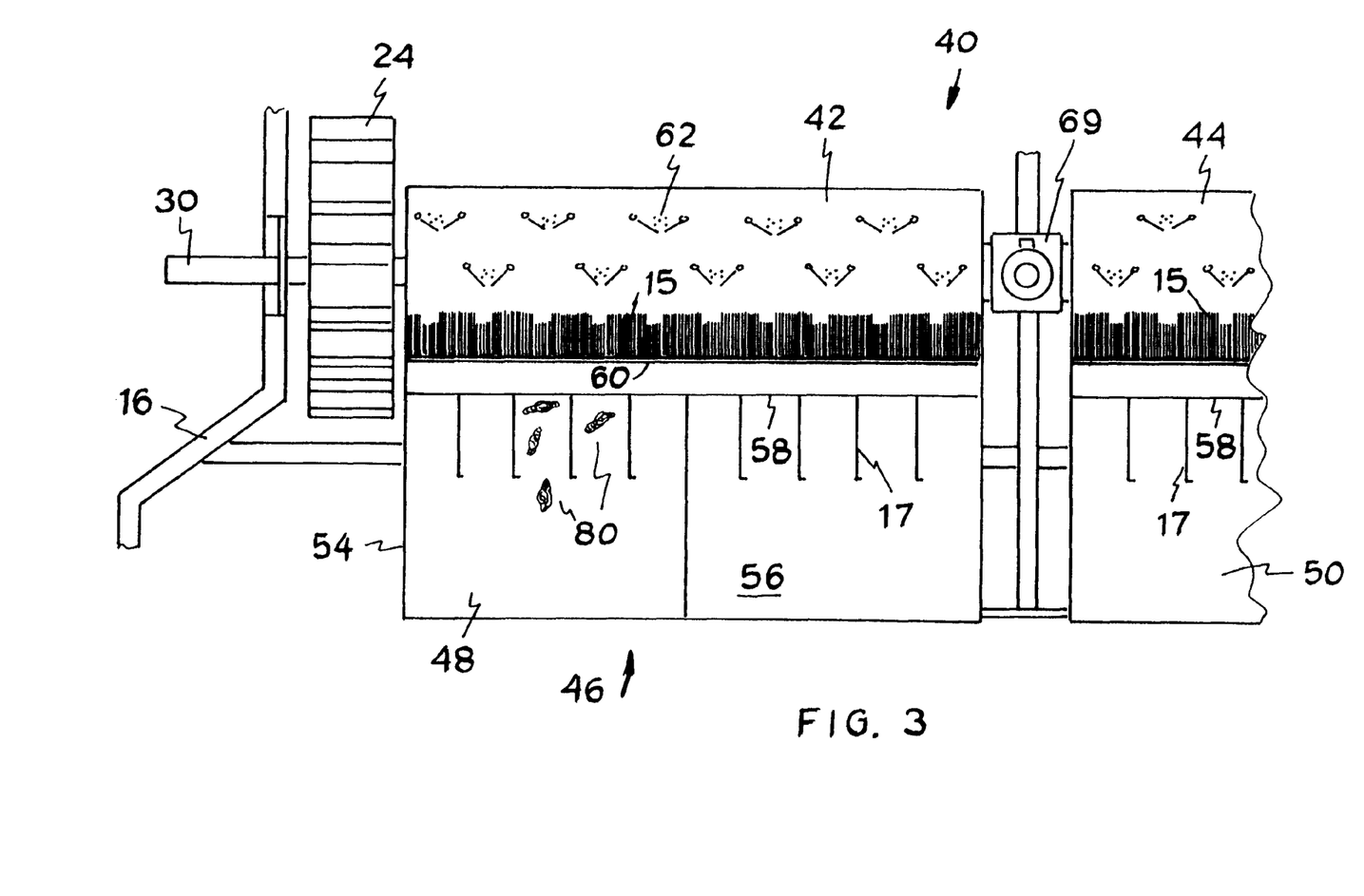
FIG. 3 is a top plan view of the portion of the seeding drum and hopper.
Figure 7:
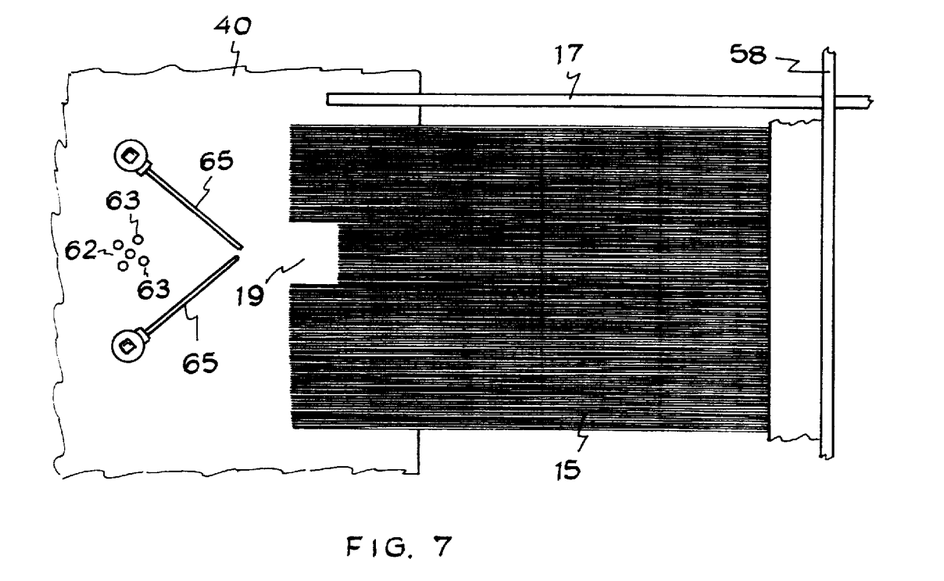
FIG. 7 is a top plan view showing a detail of a water inlet port of the planting drum and the hopper brush.

Hopper 46, comprises left side portion 48 and right side portion 50. It is affixed to frame 14 by means of bracing members 52, and is adapted for holding geoduck seedlings in contact with the planting drum. Referring to FIGS. 1–3, the hopper 46 has side walls 54, sloping rear wall 56 and front wall 58. It is separated into a plurality of sections by partition plates 17, which are attached to wall 56 and are perpendicular thereto. The hopper has an elongated opening 60 at its lower end extending between wall 56 and brush 15, opening at the face of the planting drum 40. Geoduck seedlings 80 held in the hopper leave the hopper through opening 60 to be picked up by the planting drum, as discussed below. Brush 15 extends across the top of partition plates 17, and contacts planting drum 40. It keeps the geoduck seedlings in hopper 46 from floating out as a result of turbulent water movement as the planting machine is moved under water. It thus serves as a lid on the hopper and is removable therefrom. As shown in FIG. 7, the brush has cut-outs 19 in line with water inlet ports 62 so that geoducks picked up on ports 62 are not brushed off the planting drum as they are rotated out of the hopper past the brush.

Figure 4:
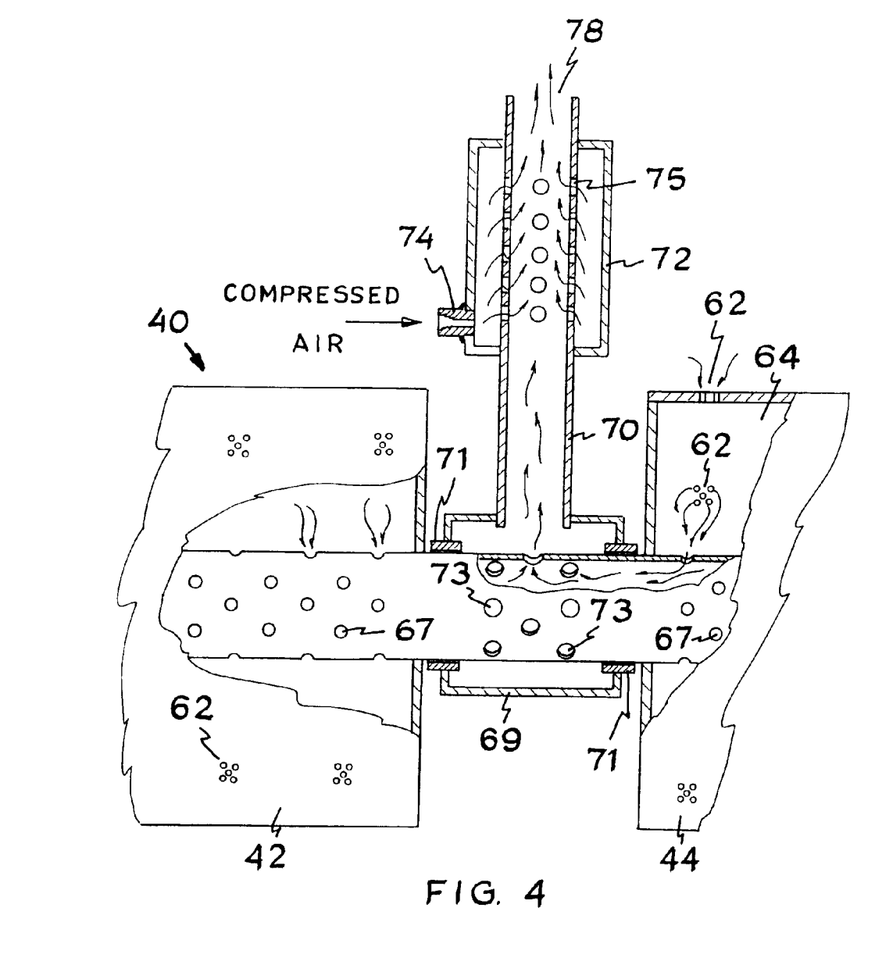
FIG. 4 is a partly cutaway view taken on the line IV—IV of FIG. 2.

Planting drum 40 has an array of water inlet ports 62 on its circumferential surface. Referring to FIG. 4, which is a partly cutaway view showing a portion of the planting drum 40, the planting drum has a hollow interior 64, and hollow axle 30 extending axially through its centre is affixed to the planting drum and rotates with it. Axle 30 has a plurality of holes 67 in its outer wall providing openings from the inside of the axle 30 to the hollow interior 64 of the drum 40. Junction box 69, supported on frame member 21 (FIG. 2), fits around axle 30 between the left and right portions 42, 44 of the planting drum. Seals 71 on the junction box 69 fit against the outer circumference of axle 30 to provide a water tight seal while permitting rotation of axle 30 within the junction box. A plurality of holes 73 in the portion of axle 30 that is inside the junction box provides openings between the interior of axle 30 and junction box 69.

Junction box 69 opens into escape pipe 70, which extends vertically from the junction box between the left and right sides of the planting drum. Expansion chamber 72 surrounds a portion of escape pipe 70, above planting drum 40. A plurality of holes 75 in escape pipe 70 within the expansion chamber provides openings between the interior of the escape pipe and the interior of the expansion chamber. The expansion chamber 72 has an air inlet port 74 at its lower end, adapted to receive a compressed air conduit.

A suction is induced at the ports 62 by the following means. Compressed air, provided from a boat at the water surface above the planting machine, is introduced into air inlet port 74 by a conduit connected to inlet port 74. The air expands within chamber 72 and passes through holes 75 into escape pipe 70, quickly rising and exiting through opening 78 at the upper end of the pipe. This causes a pressure differential within escape pipe 70 which is transferred downward through the pipe 70, holes 73 inside the junction box 69, axle holes 67, and to the interior 64 of the planting drum 40. Water surrounding the outside of the drum is now drawn in through ports 62 to equalize the low pressure inside the drum, axle bore and escape pipe, thus causing a suction effect and an inflow of water through ports 62.

The axial ends of axle 30 may be closed or may optionally have adjustable ports (not shown) which can be opened or closed to adjust the strength of the suction at ports 62. It will be apparent that opening ports at the ends of axle 30 will reduce the strength of the suction at ports 62.

Port 62 is illustrated in detail in FIG. 7. It comprises five closely spaced holes 63. Each one is approximately 2.8 mm in diameter, with a spacing of 4.8 mm between the top holes and the bottom ones in the group. This comprises a preferred hole pattern, suited to pick up and carry a single seedling 80 at a time. Two prongs 65 protruding tangentially from the surface of the drum are positioned adjacent the holes 63 to help prevent the port from picking up more than one geoduck seedling at a time.

Figure 6A:
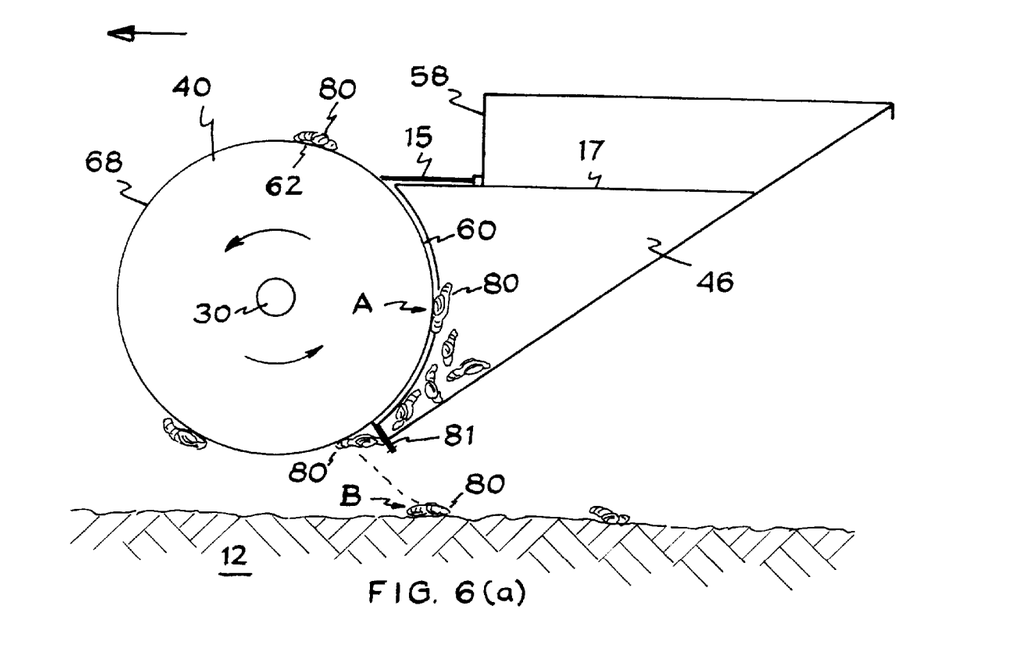
Figure 6B:
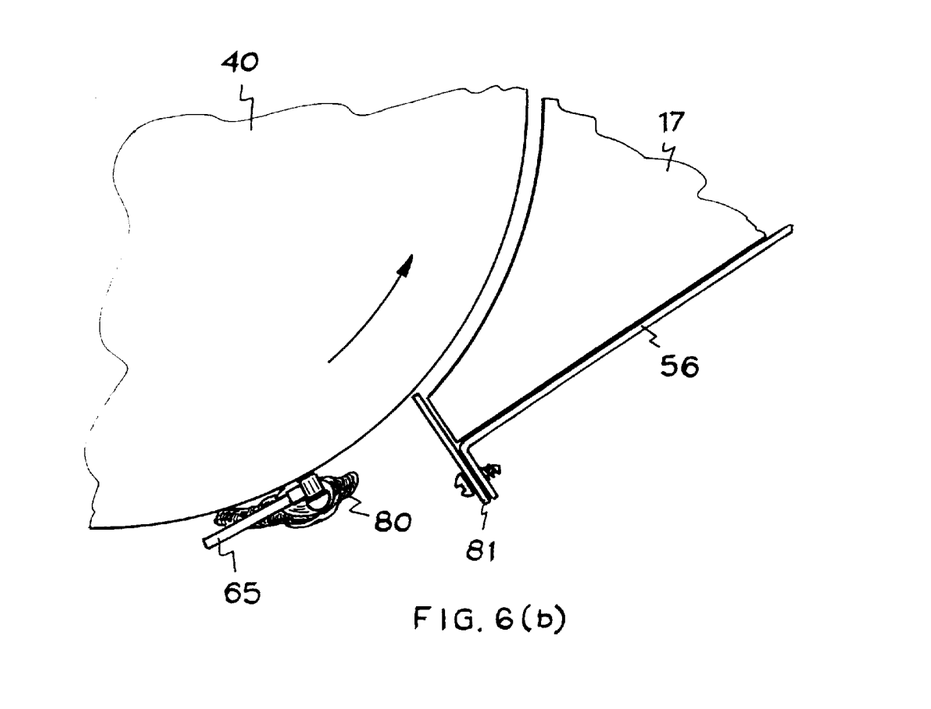
Figure 6C:
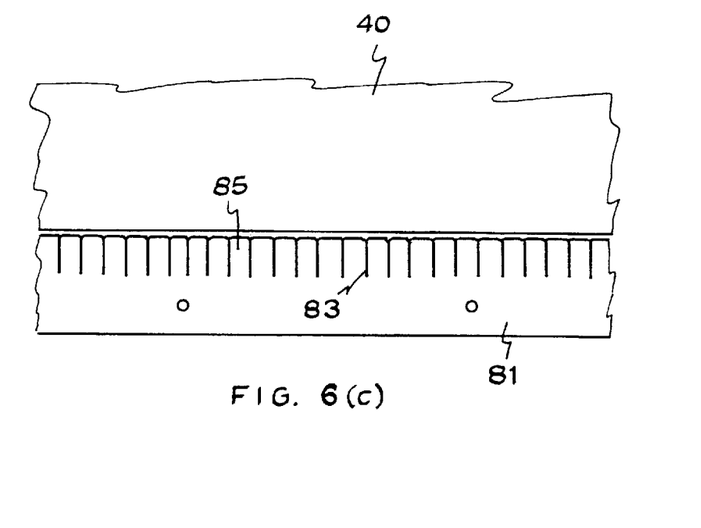

The operation of the planting drum for picking up and depositing geoduck seedlings will now be described. Geoduck seedlings, at the time that they are ready for planting, are approximately 8 to 35 mm in shell length. They are heavier than water and tend to sink in the hopper 46 to its lower end, thus passing through hopper opening 60 in the hopper and coming into contact with the surface 68 of the planting drum. As the planting machine is moved forward, in the direction shown by the arrow "A" in FIG. 1, wheels 24, 26 rotate, causing the planting drum 40 to rotate about its longitudinal axis. Compressed air is introduced into port 74 in expansion chamber 72, inducing suction at ports 62. Referring to FIG. 6(a), a geoduck seedling 80 resting at hopper opening 60, at position "A", contacts a port 62 and is held on the surface 68 of the drum at the port by the suction. The seedling is moved with the drum as the drum rotates (counterclockwise in the view of FIG. 6(a)). Referring to FIGS. 6(b) and (c), a bumper strip 81 is provided for removing the geoduck seedlings from the planting drum. Bumper strip 81 is an elongated strip attached to the lower end of the hopper 46 in close proximity to the outer surface 68 of the planting drum. It is a flexible plastic strip having cuts 83 along its extending edge to form a plurality of tabs 85. As the planting drum rotates, the geoduck seedling bumps up against bumper strip 81. A tab 85 bends to permit prongs 65 to pass under the bumper strip, and the tab knocks the geoduck seedling off the drum, so it falls to the seafloor at the position marked "B" in FIG. 6(a). The geoduck seedlings slowly bury themselves in the seafloor by digging and do not need to be buried by the machine in order to be planted effectively.

Figure 5:
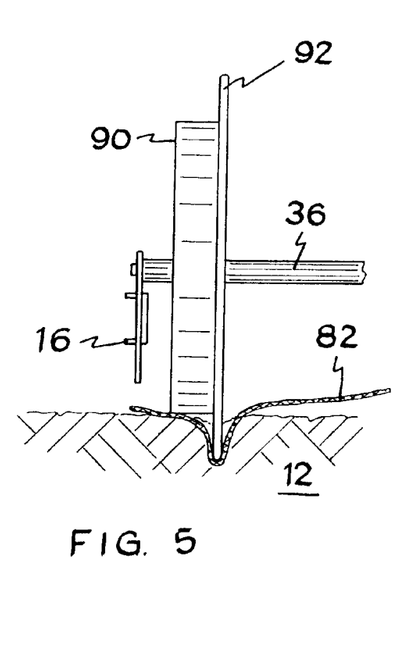
FIG. 5 is a back elevation view of a rear wheel of the machine, taken on the line V—V of FIG. 2.

Referring now to FIGS. 1, 2 and 8, the planting machine includes a net and an apparatus for setting the net on the seafloor over the deposited seedlings. Net 82 is rolled up on shaft 84, which extends laterally across the planting machine and is supported on side frame members 16, 18. Shaft 84 is held in place thereon by pairs of posts 86 and can rotate axially. The net is unwound off shaft 84, in the direction of arrow "B" in FIG. 1 as the planting machine moves forward. The net passes under flaps 88, positioned under the frame on each side in front of the rear wheels 32, 34. The rear wheels have a relatively wider outer portion 90 and a relatively narrower inner rim portion 92 which has a larger diameter than the outer rim portion 90. The inner rim portion 92 is sufficiently narrow that it tends to dig into the seafloor so the outer rim portion 90 rests on the seafloor. Each flap 88 has water outlet port 94 thereon in line with and slightly anterior to the inner rim portion 92 of the rear wheels 32, 34. A source of high pressure water is connected to the outlet ports 94 by conduits (not shown) so that a stream of high pressure water is directed down through each of the ports 94. This stream creates a channel in the seafloor just anterior to the inner rim portions 92 of the rear wheels 32, 34 into which the inner rim portions move as the planting machine advances. The net 82 passes under flaps 88 and a portion adjacent to each lateral edge of the net is pressed down into the channels by inner rim portion 92, as illustrated in FIG. 5. As the planting machine passes, silt from the seafloor falls back into the channels, tending to fill them and bury the embedded portions of the net. In this manner, the edges of the net are anchored in the seafloor.

It is desirable that the middle portion of the net be spaced somewhat from the seafloor to create a protective space above the planted seedlings. Referring to FIGS. 1, 2 and 8, rod 96 projects rearwardly from frame member 21, and forms a loop above the seafloor in the region between the rear wheels of the vehicle. As the net is reeled out as the machine moves forward, the middle of the net passes over rod 96 while the net's lateral edges pass under flaps 88. The rod 96 holds the centre portion of the net up so the net is laid with its middle part above the seafloor.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A machine for planting shellfish seedlings in a seafloor, comprising:
   (a) a frame;
   (b) means for moving said machine on said seafloor;
   (c) a seeding drum having a plurality of water inlet ports in the outer circumferential surface thereof;
   (d) a hopper for holding shellfish seedlings in contact with said outer circumferential surface of said drum;
   (e) means for producing a suction at said water inlet ports of said drum;
   (f) means for rotating said seeding drum as said machine is moved on said seafloor, whereby said seedlings in said hopper are picked up and held on said outer surface of said drum at said water inlet ports by said suction, as said drum rotates during movement of said machine; and
   (g) means for removing said seedlings from said water inlet ports for deposition of said seedlings on said seafloor.

2. A machine according to claim 1 wherein said means for producing a suction at said water inlet ports comprises an air expansion chamber and an air escape pipe operatively connected through said seeding drum to said water inlet ports.

3. A machine according to claim 1 wherein said means for moving said apparatus on said seafloor comprises wheels or tracks.

4. A machine according to claim 1 wherein said means for moving said machine on said seafloor comprises a motor and drive train.

5. A machine according to claim 1 further comprising a net for protecting said seedlings after deposition on said seafloor and means for unwinding and placing said net on the said seafloor over said deposited seedlings as said machine moves on said seafloor.

6. A machine according to claim 5 further including means for embedding lateral edges of said net in said seafloor.

7. A machine according to claim 6 wherein said means for embedding comprises wheels having rims adapted to press said edges of said net into said seafloor.

8. A machine according to claim 5 further including means to raise a centre portion of said net above said seafloor, to create a protective space above said deposited seedlings.

9. A machine according to claim 1 wherein said means for removing said seedlings comprises a bumper affixed on said machine in close proximity to said outer surface of said drum which dislodges said seedlings from said water inlet ports as said drum rotates past said bumper.

10. A method of planting shellfish seedlings in a seafloor comprising the steps of:
    (a) creating a suction at water inlet ports at the surface of a rotatable drum;
    (b) bringing said shellfish seedlings into contact with said surface of said drum;
    (c) rotating said drum, whereby said seedlings are picked up and held at said surface at said water inlet ports by said suction and are moved to a position above said seafloor; and
    (d) removing said seedlings from said water inlet ports, whereby said seedlings fall to said seafloor.

11. A method according to claim 10 wherein said step of creating a suction comprises the steps of delivering compressed gas to a chamber operatively connected through said drum to said water outlet ports and permitting said gas to expand and escape therefrom, causing a partial vacuum within said drum.

12. A method according to claim 10 further comprising the step of laying a protective net over said deposited seedlings.

13. A method according to claim 12 further comprising the steps of embedding lateral edges of said net in said seafloor and spacing a middle part of said net above said seafloor.

* * * * *